March 4, 1952 J. D. MOORE ET AL 2,587,875
CONTROL LEVER ASSEMBLY
Filed April 12, 1951 2 SHEETS—SHEET 1
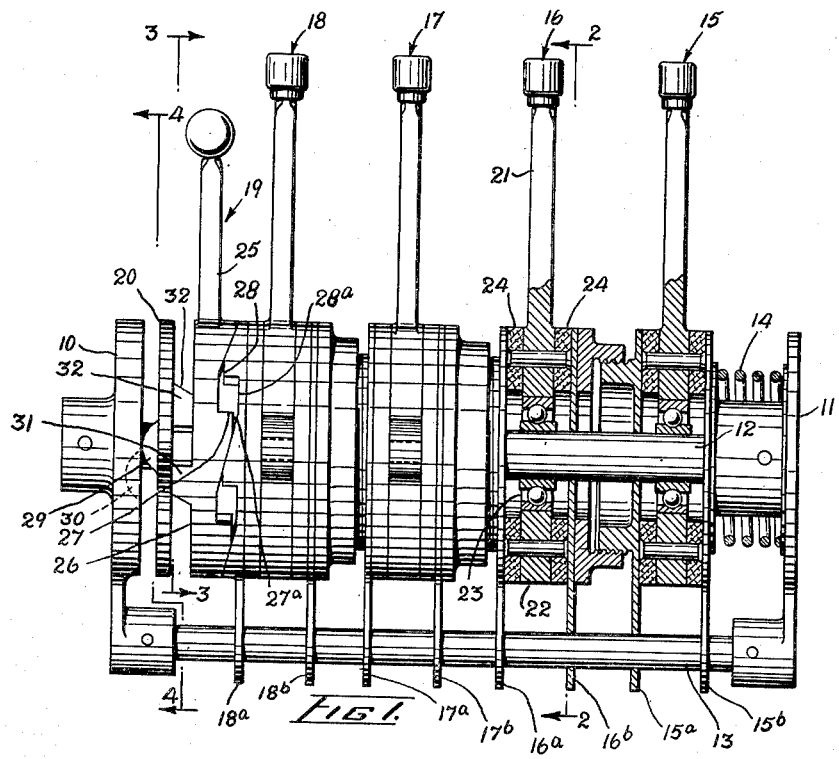
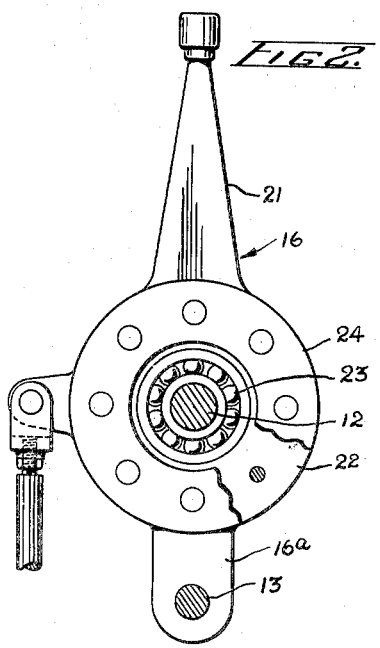
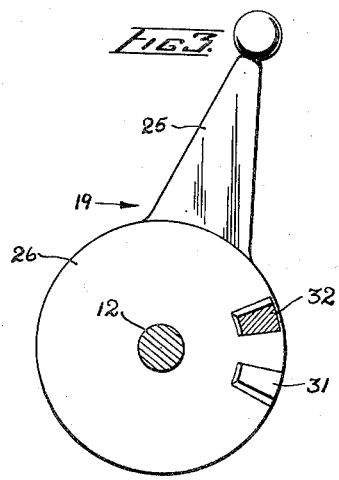
INVENTOR
J. D. MOORE
B. S. WOOD
PER
ATTORNEY March 4, 1952 J. D. MOORE ET AL 2,587,875
CONTROL LEVER ASSEMBLY
Filed April 12, 1951 2 SHEETS—SHEET 2
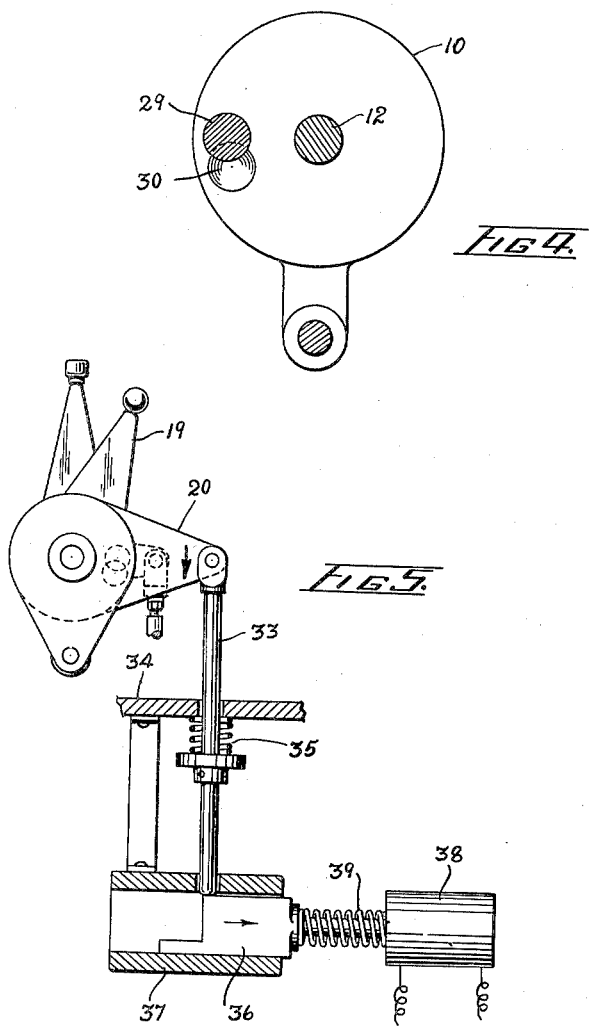
INVENTOR
J.D. MOORE
B.S. WOOD
PER
ATTORNEY Patented Mar. 4, 1952

2,587,875

UNITED STATES PATENT OFFICE 2,587,875

CONTROL LEVER ASSEMBLY

John David Moore, Long Branch, Ontario, and Bryan Stevens Wood, Toronto, Ontario, Canada, assignors to A. V. Roe Canada Limited, Malton, Ontario, Canada, a corporation Application April 12, 1951, Serial No. 220,586

10 Claims. (Cl. 74—471)

This invention relates to control lever assemblies, and more particularly to aircraft throttle control quadrant installations.

Since vibration will often cause the throttle control levers in a quadrant to "creep" from the positions in which they have been set by the operator, a friction device is customarily provided for adjusting frictional resistance to movement of the control levers in the quadrant. Occasionally, however, it is necessary to release the frictional resistance, such as in the case of an aircraft installation, when an automatic landing control unit is being utilized. Since an automatic landing control unit has direct control over movement of the aircraft's throttle control levers, it is essential that the levers be afforded complete freedom from the friction device while the unit is in use.

Accordingly, it is the main object of the invention to provide in a control lever assembly means for variably applying frictional resistance to movement of the levers, and auxiliary means for quickly releasing the frictional resistance applying means.

The invention will be more readily understood by reference to the following description of a preferred embodiment, incorporated in an aircraft throttle quadrant. In the accompanying drawings which form a part of this description and in which like reference characters designate corresponding parts throughout the several views, Fig. 1 is a broken away view of an aircraft throttle control quadrant constructed in accordance with the invention and having four throttle control levers;

Fig. 2 is a broken away cross-sectional view taken on the line 2—2 of Fig. 1 and illustrating particularly one of the throttle control levers;

Fig. 3 is a cross-sectional view taken on the line 3—3 of Fig. 1 and illustrating particularly the spring loading lever;

Fig. 4 is a cross-sectional view taken on the line 4—4 of Fig. 1 and illustrating particularly the supporting member with which co-operates the conditioning lever; and Fig. 5 is an end view of a quadrant shown coupled to a conditioning lever release mechanism constructed in accordance with the invention.

A control lever assembly or throttle control quadrant constructed in accordance with the invention comprises a frame which is secured to a convenient part of the aircraft in the pilot's compartment and it includes two opposed supports 10 and 11 between which extend shafts 12 and 13.

Serially mounted on the shaft 12 and bearing against each other are a compression spring 14, control levers 15, 16, 17 and 18, a spring loading lever 19, and a conditioning lever 20. On opposite sides of control levers 15, 16, 17 and 18 respectively are friction plates 15a and 15b, 16a and 16b, 17a and 17b, and 18a and 18b. The shaft 13 passes through openings provided in each of the friction plates and prevents them from rotating.

In the drawings, the conditioning lever is shown in conditioned position, and the loading lever is shown at a position of slight loading.

It should be noted that the control levers, the conditioning lever, the loading lever and the several friction plates are slidably mounted on the shaft 12. Although in the construction illustrated several control levers have been shown, it will of course be obvious that this is not an essential feature of the invention and that one control lever would be sufficient. The four control levers are substantially similar in their details of construction and therefore only control lever 16 will be described in detail. It includes a handle 21, one end of which terminates in a ring 22 which is rotatably mounted on the shaft 12 by a ball bearing 23. Secured by rivets to either side of the ring 22 are friction rings 24, against which bear the friction plates 16a and 16b.

The spring loading lever 19 includes a handle 25 at one end of which is a cam disc 26. On one face of the disc 26 is an annular series of cams 27 which engage corresponding cams 28 provided on the opposed face of the adjacent friction plate 18a. It will be apparent that if the conditioning lever 19 is rotated counterclockwise (viewed from the right) the two series of cams 27 and 28 will slide with respect to each other and thus the distance between the left-hand side of the conditioning lever 19 and the friction plate 18a will increase. Conditioning lever 19 and friction plate 18a taken together can be considered as an expansible unit, and thus the unit expands when the conditioning lever is rotated counterclockwise (viewed from the right) and since it consequently will occupy more of the available space between the opposed supports 10 and 11, the spring 14 will be compressed. Obviously the extent to which the spring 14 is compressed and the frictional resistance to movement of the control levers thereby applied will vary with the angular position of the loading lever.

On the left-hand side of the conditioning lever 20 is provided a cam or boss 29 which is adapted to register with a recess 30 provided in the support 10. As previously mentioned, the conditioning lever is shown in conditioning position, that is, in the position wherein the boss and recess are not in registration and therefore the distance between the conditioning lever and the support 10 is at a maximum. If the conditioning lever is rotated counterclockwise (viewed from the right) (by about 20° in the construction illustrated) the boss will register with the recess and fall therein.

The cams 27 and 28, and the boss 29 and recess 30 are so proportioned and dimensioned that when the conditioning lever 20 is at the release position the spring 14 is substantially uncompressed, irrespective of the angular position of the loading lever 19. In other words, the spring 14 can be compressed only if the conditioning lever is at the conditioning position and therefore if after the conditioning lever has been adjusted to conditioning position and the loading lever has been set at an angular position such as to apply a desired amount of friction to the control levers, and the conditioning lever is subsequently moved to release position, the friction applied to the control levers will be released.

On opposed sides of the loading lever 19 and the conditioning lever 20 are provided fingers 31 and 32 respectively, which are in circumferential alignment and adapted to engage. These fingers are so located that when the loading lever is rotated in a clockwise direction (viewed from the right) to the "full off" position they will engage and the finger 31 will rotate the conditioning lever 20 in a clockwise direction (viewed from the right) causing the boss 29 to leave the recess 30 and ride up on the face of the support 10, and thus the conditioning lever will be returned to conditioning position. To permit clockwise movement of the conditioning lever 19 to the "full off" position, the flats 28a of the cams 28 are made wider than the flats 27a of the cams 27.

The mechanism for moving the conditioning lever to release position is particularly illustrated in Fig. 5. It comprises a rod 33 pivotally connected at one end to the free end of the conditioning lever 20 and extending through a fixed part 34 of the aircraft structure. A spring 35 which is in compression between the fixed part 34 and a collar provided on the rod urges the rod downwardly to rotate the conditioning lever to release position. The free end of the rod 33 bears against a stepped block or detent 36 slidably mounted in a fixed slide 37. The detent is coupled to the armature of a solenoid 38.

A compression spring 39 is provided to normally hold the detent 36 in the position illustrated. In that position, the free end of the rod 33 engages the high portion of the detent 36 and holds the conditioning lever 20 in conditioning position, against the force of spring 35 which is urging it to release position. If solenoid 38 is energized, the detent 36 will immediately move to the right thereby enabling the spring 35 to move the rod 33 downwardly and thus rotate the conditioning lever 20 to release position. It will be apparent that even if the solenoid is de-energized, the rod 33 cannot per se return the conditioning lever to conditioning position. However, if the loading lever is rotated to "full off" position as previously described it will rotate the conditioning lever to conditioning position thus lifting the rod 33 and when the rod clears the high portion of the detent 36 the detent will be moved to the left by compression spring 39; the device is thus re-set.

In practice, the solenoid 38 is connected into the circuit for the automatic landing control unit of an aircraft in such a manner that when the landing control unit is turned on the solenoid is energized. Thus, if the pilot previously has applied friction to the control levers by suitably rotating the loading lever, the frictional load on the control levers will be eliminated as soon as the landing control unit is turned on.

It will of course be understood that the invention is not solely for use in aircraft, and although it has herein been described as being embodied in an aircraft throttle control quadrant installation and reference has been made to its relationship with an automatic landing control unit, these features have been mentioned by way of example only. Moreover various changes in the shape, size and arrangement of parts may be resorted to without departing from the spirit of the invention or the scope of the sub-joined claims.

What we claim as our invention is:

1. A control lever assembly comprising a shaft, a control lever mounted on the shaft for rotation, a compression spring to provide under compressive force an axial loading on the lever which restrains the lever's freedom to rotate, two non-rotatable members mounted on the shaft, spring loading means including a loading lever mounted on the shaft for rotation and having a face which bears against the opposed face of one of the members, a cam being provided on one of the said faces which co-operates with the face in opposition to it to vary the distance between the loading lever and the said one member when the loading lever is rotated, and a conditioning device for the spring loading means including a conditioning lever mounted on the shaft for rotation and having a face which bears against the opposed face of the other member, a cam being provided on one of the opposed faces of the conditioning lever and the said other member, the said cam co-operating with the face in opposition to it to vary the distance between the conditioning lever and the said other member when the conditioning lever is rotated, the said variation in distance between the conditioning lever and the said other member being selectively adjustable to two positions by rotation of the conditioning lever, namely a release position and a conditioning position, whereby when the conditioning lever is in release position the force applied by the loading lever to the compression spring does not vary substantially with variations in the angular position of the loading lever, and when the conditioning lever is in conditioning position the variations in the angular position of the loading lever cause variations in distance between the loading lever and the member against which its face bears and thus vary the force applied to the compression spring.

2. A control lever assembly comprising a shaft, a control lever mounted on the shaft for rotation, a compression spring to provide under compressive force an axial loading on the lever which restrains the lever's freedom to rotate, two non-rotatable members mounted on the shaft, spring loading means including a loading lever mounted on the shaft for rotation and having a face which bears against the opposed face of one of the members, a cam being provided on one of the said faces which co-operates with the face in opposition to it to vary the distance between the loading lever and the said one member when the loading lever is rotated, and a conditioning device for the spring loading means including a conditioning lever mounted on the shaft for rotation and having a face which bears against the opposed face of the other member, a cam being provided on one of the opposed faces of the conditioning lever and the said other member, the said cam co-operating with the face in opposition to it to vary the distance between the conditioning lever and the said other member when the conditioning lever is rotated, the said variation in distance between the conditioning lever and the said other member being selectively adjustable to two positions by rotation of the conditioning lever, namely a release position and a conditioning position, variations in distance between the loading lever and the member against which its face bears varying the force applied to the compression spring when the conditioning lever is in the conditioning position, the force applied by the loading lever to the compression spring being a minimum irrespective of the angle of rotation of the loading lever when the conditioning lever is at the release position, and the said force varying with the angle of rotation of the loading lever between the said minimum and a value greater than the said minimum when the conditioning lever is at the conditioning position.

3. A control lever assembly comprising a frame including two opposed shaft supporting members, a shaft supported by and extending between the said supporting members, a control lever mounted on the shaft for rotation with respect to the frame, a compression spring disposed between the lever and one of the supporting members to provide under compressive force an axial loading therebetween which restrains the lever's freedom to rotate, a non-rotatable member slidably mounted on the shaft and interposed between the lever and one of the shaft supporting members, compression spring loading means including a loading lever mounted on the shaft for rotation and having a face which bears against the opposed face of one of the members, a cam being provided on one of the said faces which co-operates with the face in opposition to it to vary the distance between the loading lever and the member against which its face bears when the loading lever is rotated, and a conditioning device for the spring loading means including a conditioning lever mounted on the shaft for rotation and having a face which bears against the opposed face of one of the members other than the member against which a face of the loading lever bears, a cam being provided on one of the opposed faces of the conditioning lever and the member against which the conditioning lever bears, the said cam co-operating with the face in opposition to it to vary the distance between the conditioning lever and the member against which it bears when the conditioning lever is rotated, the said variations in distance between the conditioning lever and the member against which it bears being selectively adjustable to two positions by rotation of the conditioning lever, namely a release position and a conditioning position, whereby when the conditioning lever is in release position the force applied by the loading lever to the compression spring does not vary substantially with variations in the angular position of the loading lever, and when the conditioning lever is in conditioning position the variations in the angular position of the loading lever cause variations in distance between the loading lever and the member against which its face bears and thus vary the force applied to the compression spring.

4. A control lever assembly comprising a shaft, a control lever mounted on the shaft for rotation, a compression spring to provide under compressive force an axial loading on the lever which restrains the lever's freedom to rotate, two non-rotatable members mounted on the shaft, spring loading means including a loading lever mounted on the shaft for rotation and having a face which bears against the opposed face of one of the members, a cam being provided on one of the said faces which co-operates with the face in opposition to it to vary the distance between the loading lever and the said one member when the loading lever is rotated, a conditioning device for the spring loading means including a conditioning lever mounted on the shaft for rotation and having a face which bears against the opposed face of the other member, a cam being provided on one of the opposed faces of the conditioning lever and the said other member, the said cam co-operating with the face in opposition to it to vary the distance between the conditioning lever and the said other member when the conditioning lever is rotated, the said variation in distance between the conditioning lever and the said other member being selectively adjustable to two positions by rotation of the conditioning lever, namely a release position and a conditioning position, whereby when the conditioning lever is in release position the force applied by the loading lever to the compression spring does not vary substantially with variations in the angular position of the loading lever, and when the conditioning lever is in conditioning position the variations in the angular position of the loading lever cause variations in distance between the loading lever and the member against which its face bears and thus vary the force applied to the compression spring, spring means coupled to the conditioning lever and tending to rotate it to release position, a triggering device normally preventing rotation of the conditioning lever to release position, and means for actuating the triggering device to permit rotation of the conditioning lever to release position by the spring means.

5. A control lever assembly comprising a shaft, a control lever mounted on the shaft for rotation, a compression spring to provide under compressive force an axial loading on the lever which restrains the lever's freedom to rotate, two non-rotatable members mounted on the shaft, spring loading means including a loading lever mounted on the shaft for rotation and having a face which bears against the opposed face of one of the members, a cam being provided on one of the said faces which co-operates with the face in opposition to it to vary the distance between the loading lever and the said one member when the loading lever is rotated, a conditioning device for the spring loading means including a conditioning lever mounted on the shaft for rotation and having a face which bears against the opposed face of the other member, a cam being provided on one of the opposed faces of the conditioning lever and the said other member, the said cam co-operating with the face in opposition to it to vary the distance between the conditioning lever and the said other member when the conditioning lever is rotated, the said variation in distance between the conditioning lever and the said other member being selectively adjustable to two positions by rotation of the conditioning lever, namely a release position and a conditioning position, whereby when the conditioning lever is in release position the force applied by the loading lever to the compression spring does not vary substantially with variations in the angular position of the loading lever, and when the conditioning lever is in conditioning position the variations in the angular position of the loading lever cause variations in distance between the loading lever and the member against which its face bears and thus vary the force applied to the compression spring, a reciprocatable rod pivotally connected at one end to the conditioning lever and which when moved in one sense rotates the conditioning lever to release position, a spring coupled to the rod and urging it in the said sense, a detent having a high point against which the other end of the rod normally bears, the said high point preventing movement of the rod in the said sense, and means for moving the detent from high point engagement with the rod to permit rotation of the conditioning lever to release position.

6. A control lever assembly comprising a shaft, a control lever mounted on the shaft for rotation, a compression spring to provide under compressive force an axial loading on the lever which restrains the lever's freedom to rotate, two non-rotatable members mounted on the shaft, spring loading means including a loading lever mounted on the shaft for rotation and having a face which bears against the opposed face of one of the members, a cam being provided on one of the said faces which co-operates with the face in opposition to it to vary the distance between the loading lever and the said one member when the loading lever is rotated, a conditioning device for the spring loading means including a conditioning lever mounted on the shaft for rotation and having a face which bears against the opposed face of the other member, a cam being provided on one of the opposed faces of the conditioning lever and the said other member, the said cam co-operating with the face in opposition to it to vary the distance between the conditioning lever and the said other member when the conditioning lever is rotated, the said variation in distance between the conditioning lever and the said other member being selectively adjustable to two positions by rotation of the conditioning lever, namely a release position and a conditioning position, whereby when the conditioning lever is in release position the force applied by the loading lever to the compression spring does not vary substantially with variations in the angular position of the loading lever, and when the conditioning lever is in conditioning position the variations in the angular position of the loading lever cause variations in distance between the loading lever and the member against which its face bears and thus vary the force applied to the compression spring, a rod pivotally connected at one end to the conditioning lever, spring means coupled to the rod and urging it to move in one sense and thus rotate the conditioning lever to release position, a fixed slide, a block slidable in the slide and having a high portion and a low portion, the other end of the rod normally bearing against the high portion of the block which prevents the rod from moving in the said one sense, and means to move the block to a position at which the rod clears the high portion and drops to the low portion thus rotating the conditioning lever to release position.

7. A control lever assembly comprising a shaft, a control lever mounted on the shaft for rotation, a compression spring to provide under compressive force an axial loading on the lever which restrains the lever's freedom to rotate, two non-rotatable members mounted on the shaft, spring loading means including a loading lever mounted on the shaft for rotation and having a face which bears against the opposed face of one of the members, a cam being provided on one of the said faces which co-operates with the face in opposition to it to increase the distance between the loading lever and the said one member when the loading lever is rotated in one sense, a conditioning device for the spring loading means including a conditioning lever mounted on the shaft adjacent the loading lever for rotation and having a face which bears against the opposed face of the other member, a cam being provided on one of the opposed faces of conditioning lever and the said other member, the said cam co-operating with the face in opposition to it to vary the distance between the conditioning lever and the said other member when the conditioning lever is rotated, the said variation in distance between the conditioning lever and the said other member being selectively adjustable to two positions by rotation of the conditioning lever, namely a release position and a conditioning position, whereby when the conditioning lever is in release position the force applied by the loading lever to the compression spring does not vary substantially with variations in the angular position of the loading lever, and when the conditioning lever is in conditioning position the variations in the angular position of the loading lever cause variations in distance between the loading lever and the member against which its face bears and thus vary the force applied to the compression spring, and co-operating fingers on the loading lever and conditioning lever, the finger on the conditioning lever being engaged by the finger on the loading lever if the conditioning lever is at the release position when the loading lever is rotated in the other sense thereby returning the conditioning lever to conditioning position.

8. A control lever assembly comprising a shaft; spaced stops axially fixed with respect to each other; a rotatable control lever, an expansible unit, a rotatable conditioning lever and a spring serially mounted on the shaft and bearing against each other; at least one of the control lever and the conditioning lever being slidable on the shaft; the conditioning lever and one of the stops having opposed faces and bearing against each other; a recess and a cam adapted to register with each other being provided on the opposed faces of the conditioning lever and the said one stop; the conditioning lever being rotatable to two positions, namely a release position at which the recess and cam are in registration and a conditioning position at which the recess and cam are not in registration; the expansible unit comprising a rotatable loading lever and a non-rotatable member, at least one of which is slidable on the shaft; the loading lever and the non-rotatable member having opposed camming faces in engagement with each other; rotation of the loading lever in one sense causing expansion of the expansible member to increase the spring compression when the conditioning lever is at conditioning position; and the conditioning lever when at the release position releasing the spring compression.

9. A control lever assembly comprising a shaft; spaced stops axially fixed with respect to each other; a rotatable control lever, an expansible unit, a rotatable conditioning lever and a spring serially mounted on the shaft and bearing against each other; at least one of the control lever and the conditioning lever being slidable on the shaft; the conditioning lever and one of the stops having opposed faces and bearing against each other; a recess and a cam adapted to register with each other being provided on the opposed faces of the conditioning lever and the said one stop; the conditioning lever being rotatable to two positions, namely a release position at which the recess and cam are in registration and a conditioning position at which the recess and cam are not in registration; the expansible unit comprising a rotatable loading lever and a non-rotatable member, at least one of which is slidable on the shaft; the loading lever and the non-rotatable member having opposed camming faces in engagement with each other; rotation of the loading lever in one sense causing expansion of the expansible member to increase the spring compression when the conditioning lever is at conditioning position; the conditioning lever when at the release position releasing the spring compression; and co-operating fingers on the loading lever and conditioning lever, the finger on the conditioning lever being engaged by the finger on the loading lever if the conditioning lever is at the release position when the loading lever is rotated in the other sense thereby returning the conditioning lever to conditioning position.

10. A control lever assembly comprising two spaced shaft supporting members, a shaft supported by and extending between the supporting members, a control lever mounted on the shaft for rotation, a compression spring interposed between the lever and one of the supporting members to provide when compressed an axial loading on the lever which restrains the lever's freedom to rotate, spring loading means mounted between the shaft supporting members to vary the loading on the spring and apply to the control lever a variable amount of friction, and a conditioning device for the spring loading means also mounted between the shaft supporting members, the conditioning device comprising two parts one of which is axially movable when one of the parts is rotated relative to the other to selectively vary the loading on the spring independently of the loading means.

JOHN DAVID MOORE.
BRYAN STEVENS WOOD.

REFERENCES CITED

The following references are of record in the file of this patent:

UNITED STATES PATENTS

| Number | Name | Date |
|---|---|---|
| 1,399,038 | Valois | Dec. 6, 1921 |
| 1,404,635 | Muehlhauser | Jan. 24, 1922 |
| 2,382,330 | Pain | Aug. 14, 1945 |

FOREIGN PATENTS

| Number | Country | Date |
|---|---|---|
| 230,482 | Great Britain | May 14, 1925 |